Figure 1:
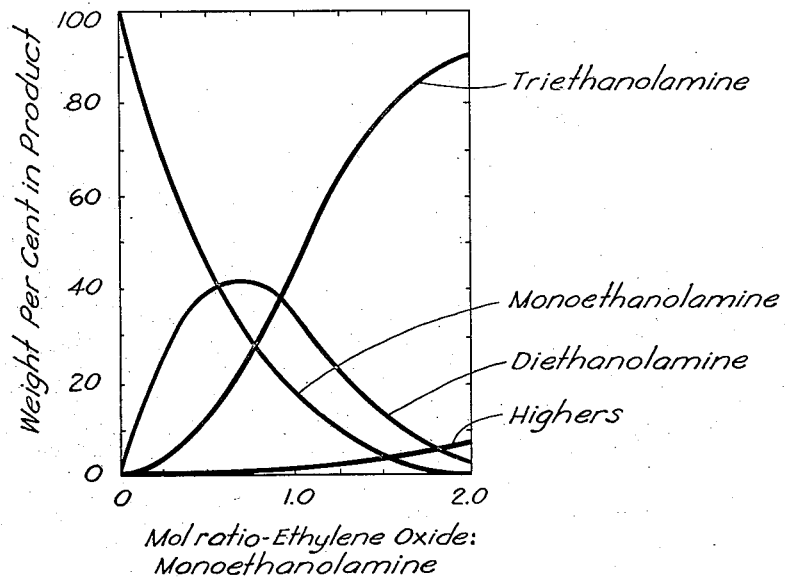

INVENTORS.
Myron E. Huscher
Merton W. Long, Jr.
John C. Moore
BY
Griswold & Burdick
ATTORNEYS

UNITED STATES PATENT OFFICE 2,602,819

PROCESS FOR MAKING POLYALKANOL-AMINES

Myron E. Huscher, Merton W. Long, Jr., and John C. Moore, Midland, Mich., assignors to The Dow Chemical Company, Midland, Mich., a corporation of Delaware Application March 20, 1947, Serial No. 736,074

10 Claims. (Cl. 260—584)

This invention relates to an improved process for making polyalkanolamines.

It is well known (see, for example, U. S. Patent 2,373,199) that the reaction of olefin oxides with ammonia to form polyalkanolamines will not proceed in the absence of water, except under conditions of extreme pressure and high temperature. In consequence, the commercial manufacture of polyalkanolamines is almost invariably carried out using aqueous ammonia. The reaction product accordingly contains a considerable amount of water, from which the polyalkanolamine can be separated only by elaborate dehydration procedures or prolonged distillation at high temperature. As a result, the desired polyalkanolamine is accompanied by a sizeable proportion of higher condensation products and dark tars. Thus, while there is a potential demand in the cosmetic industry and elsewhere for water-white triethanolamine and related polyalkanolamines, no really adequate process for making products of this purity has been available.

It is therefore an object of the present invention to provide a simple process for making practically colorless polyalkanolamines which are largely free of high-boiling impurities. Another object is to provide a process which can be easily carried out on a large scale at ordinary temperatures and without the use of high-pressure equipment. An additional object is to provide a process by which a commercially acceptable polyalkanolamine product can be made without the necessity of distillation or other purification steps.

The invention is based on the discovery that the lower olefin oxides, although unreactive with anhydrous ammonia at ordinary temperatures and pressures, none the less react rapidly under these conditions with anhydrous primary and secondary alkanolamines to produce polyalkanolamines. Further, when the reaction temperature is prevented from rising unduly and the proportion of olefin oxide is restricted, the resulting products are substantially colorless and free of high-boiling impurities.

Briefly, the process of the invention comprises passing a lower olefin oxide into intimate contact with an anhydrous alkanolamine corresponding to the general formula R—NH—R' wherein R is a monohydroxy lower alkyl radical and R' is a substituent of the class consisting of monohydroxy lower alkyl radicals and hydrogen. The reaction temperature is maintained below 100° C., and the olefin oxide is added in a molecular proportion relative to the alkanolamine not exceeding 1:1 when R' is monohydroxy lower alkyl and 2:1 when R' is hydrogen.

The lower olefin oxide reactant used in the process may be any hydrocarbon oxide containing five or less carbon atoms per molecule, the oxygen being attached to each of two adjacent carbon atoms. Of these, ethylene oxide and propylene oxide are of major present significance, with isobutylene oxide and butadiene monoxide finding increasing use.

The alkanolamine reactant is a mono- or di-lower alkanol monoamine in which the alkylene radical of each hydroxyalkyl substituent contains five or less carbon atoms per radical. Typical of these are monoethanolamine, monoisopropanolamine, monoisobutanolamine, diethanolamine, di-isopropanolamine, and monoethanol monoisopropanolamine. These reactants are for the most part available commercially in a good state of purity. They are ordinarily supplied in the anhydrous condition, but if any substantial proportion of water is present, it should be removed, as by fractional distillation. Mere traces of water may be tolerated.

In carrying out the process, a body of the anhydrous alkanolamine reactant, e. g. monoethanolamine, is placed in a suitable vessel and is agitated continuously while the olefin oxide is introduced gradually over a period of time. Catalysts or solvents are not required. Since considerable heat is liberated by the reaction, it is desirable to supply cooling and also to regulate the rate of adding the oxide to avoid undue temperature rise. It is preferable to conduct the reaction under reflux or in a closed vessel at a pressure at least equal to the autogenous pressure of the reaction mixture, to prevent loss of volatile olefin oxide. The pressures involved seldom if ever exceed two or three atmospheres. The reaction proceeds rapidly, and is usually over within from a few minutes to a few hours after addition of the olefin oxide is finished, completion being indicated when evolution of heat ceases.

The product of the reaction is a substantially colorless mixture of polyalkanolamines which is acceptable per se for many commercial uses. However, if desired, the individual polyalkanolamines may be readily isolated by fractional distillation at reduced pressure.

As already stated, the temperature of the reacting mixture should be controlled to avoid exceeding about 100° C., in order to prevent formation of undesirable by-products. Since, in general, reaction proceeds readily at any temperature above about 0° C., it is ordinarily not necessary to approach the upper limit. For example, the reaction of ethylene oxide with monoethanolamine is conveniently carried out in a closed vessel at a temperature between about 20° C. and about 80° C.

The proportion of olefin oxide relative to the alkanolamine should be restricted to not more than a molecular ratio of 2:1 when the reactant is a monoalkanolamine and not more than 1:1 when the reactant is a dialkanolamine. Higher proportions of olefin oxide result in the formation of condensation products of higher molecular weight which appear as impurities in the final polyalkanolamine. Within the limits given, the ratio of olefin oxide to alkanolamine may be controlled to produce any desired ratio of dialkanolamine to trialkanolamine in the reaction product. For example, with a monoalkanolamine reactant, the addition of not over about 100 mol percent of an olefin oxide will insure preponderance of a dialkanolamine, while with a higher proportion, from 150 to 200 mol percent, a trialkanolamine is the major reaction product. In the reaction of ethylene oxide with monoethanolamine to form triethanolamine, the optimum molecular ratio is from about 1.6:1 to about 1.7:1. However, when propylene oxide is reacted with monoisopropanolamine, a somewhat higher ratio, at least 1.8:1, is preferred, since in this case there is little if any tendency for the formation of high-boiling condensation products. In condensing an olefin oxide with a dialkanolamine the preferred mol ratio is between 0.5:1 and 1:1 to insure producing a major proportion of trialkanolamine.

Figure 2:
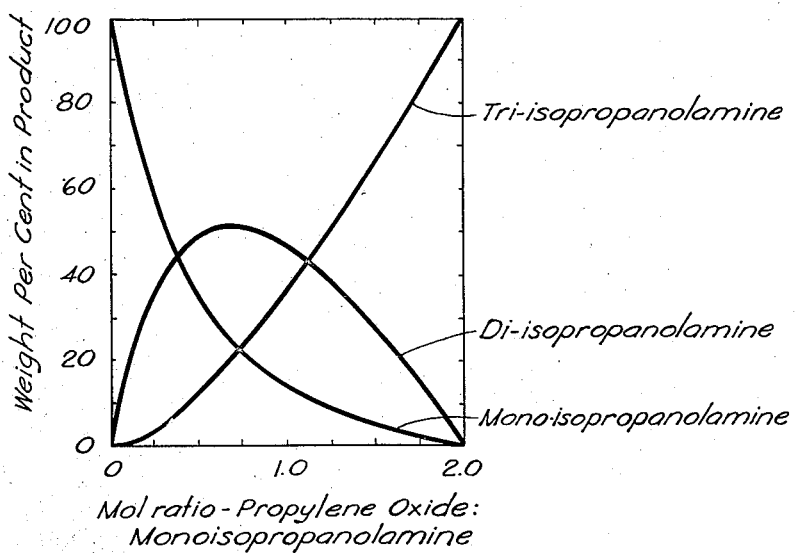

These various effects may be further understood by reference to the accompanying drawing, in which Fig. 1 is a graph showing the relative proportions by weight of monoethanolamine, diethanolamine, triethanolamine, and higher boiling materials in the product of the reaction of ethylene oxide with anhydrous monoethanolamine at ordinary temperature as a function of the mol ratio of ethylene oxide to monoethanolamine; and Fig. 2 is a similar graph for the reaction of propylene oxide with monoisopropanolamine.

The process of the present invention may be further illustrated by the following examples.

Example 1

A charge of 11.2 gram-mols of anhydrous monoethanolamine was placed in a reaction vessel provided with an agitator and a reflux condenser and was cooled to a temperature of 5° to 10° C. Liquid ethylene oxide, 18.7 gram-mols in all, was introduced gradually over a 3-hour period, the reaction mixture being maintained at about 10° C. by indirect cooling. Agitation was then continued overnight while the reaction mixture was allowed to warm to room temperature. The resulting product was a water-white liquid. A quantitative fractional distillation of the product at reduced pressure gave the following analysis: triethanolamine, 81.5 percent by weight; diethanolamine 12.6 percent; monoethanolamine, 3.8 percent; and higher boiling products, 2.4 percent.

Example 2

A charge of 10.0 gram-mols of monoethanolamine was cooled to 10° C. and 20.0 mols of ethylene oxide was added according to the procedure of Example 1. The reaction product had a molecular weight, as determined by titration, of 151, and analyzed as follows: triethanolamine, 90.6 percent by weight; diethanolamine, 2.4 percent; monoethanolamine, 0.2 percent; and higher boiling products 6.7 percent.

Example 3

In a large-scale batch preparation, a charge of monoethanolamine was loaded into a closed reactor provided with an agitator and cooling coils and was cooled at 20° C. Ethylene oxide, in the ratio of 1.6 mols per mol of ethanolamine, was added in 12 equal portions over an 8-hour period. After each addition, the temperature of the reaction mixture rose gradually to a maximum of 70° to 90° C. and then was allowed to return to about 30° C. before the next portion was added. Maximum pressure was not over 20 pounds per square inch gage. At the end of the 8-hour period, the product was a substantially colorless mixture of polyalkanolamines which was packaged for sale. It had an analysis substantially identical with that given in Example 1.

Example 4

To a charge of 10.0 gram-mols of monoisopropanolamine, 20.0 gram-mols of propylene oxide was added slowly over a 3-hour period; the resulting mixture was then allowed to stand overnight. The reaction product, a colorless liquid, had a molecular weight, as determined by titration, of 192. The analysis of the product by quantitative fractional distillation showed: triisopropanolamine, 98.5 percent by weight; diisopropanolamine 1.3 percent; monoisopropanolamine 0.0 percent; higher boiling residue, less than 0.2 percent.

Example 5

To a charge of 1.0 gram-mol of diethanolamine at 25° C., 0.93 mol of propylene oxide was added slowly over a 3-hour period, after which the mixture was allowed to stand overnight. The resulting product was a colorless liquid. It was separated into its components by fractional distillation at reduced pressure. The analysis was: diethanolmonoisopropanolamine, 93.2 percent by weight; diethanolamine, 6.6 percent; high boiling residue 0.2 percent. The diethanolmonoisopropanolamine (N,N-bis(2-hydroxyethyl)amino-2-propanol) ($C_7H_{17}O_3N$) was a colorless liquid which boiled from 148° to 152° C. at 1.0 mm. of mercury absolute pressure, and had a specific gravity of 1.076 25°/25° C. and a refractive index of 1.4751 $n_D^{25°}$. So far as known, this compond has not previously been characterized.

From the foregoing, it will be apparent that the process of the invention overcomes several of the disadvantages of prior methods of making polyalkanolamines. The reaction is carried out in the absence of water and other solvents and also in the absence of ammonia. As a result, formation of undesired byproducts is materially reduced and yields of desired polyalkanolamines are exceptionally high. Because of the absence of water, no difficulty is encountered in separating the reaction product into its components by fractional distillation. However, the product, even before distillation, is usually colorless and without further treatment is admirably suited for many commercial uses.

Attention is directed to our continuation-in-part application Serial No. 4,466 filed January 26, 1948, in which there are claimed two of the new mixed trialkanolamines disclosed herein, and to a related copending application by one of us, now U. S. Patent 2,497,553, in which are claimed certain new butenol alkanolamines.

Attention is directed to our continuation-in-part application Serial No. 4,466 filed January 26, 1948, where the substance described in Example 5 above and related compounds are claimed.

What is claimed is:

1. The process of making polyalkanolamines which comprises passing a lower olefin oxide into intimate contact with an anhydrous alkanolamine corresponding to the general formula R—NH—R' wherein R is a monohydroxy lower alkyl radical and R' is a substituent of the class consisting of monohydroxy lower alkyl radicals and hydrogen in the absence of a solvent and of ammonia while maintaining a reaction temperature between about 0° C. and 100° C., the oxide being added in a molecular proportion relative to the alkanolamine not exceeding 1:1 when R' is monohydroxy lower alkyl and 2:1 when R' is hydrogen.

2. A process according to claim 1 wherein the process is carried out at a temperature between 20° C. and 80° C.

3. The process of making a polyalkanolamine mixture containing a major proportion of a trialkanolamine which consists in gradually introducing a lower olefin oxide into a body of an anhydrous di-lower-alkanol monoamine while maintaining a reaction temperature between 0° C. and 100° C., the oxide being added in a molecular proportion relative to the dialkanolamine between 0.5:1 and 1:1.

4. The process of making a polyalkanolamine mixture containing a major proportion of a trialkanolamine which consists in gradually introducing a lower olefin oxide into a body of an anhydrous mono-lower-alkanol monoamine while maintaining a reaction temperature between 0° C. and 100° C., the oxide being added in a molecular proportion relative to the alkanolamine between 1.5:1 and 2:1.

5. A process according to claim 4 wherein the olefin oxide is ethylene oxide and the alkanolamine is monoethanolamine.

6. A process according to claim 5 wherein the molecular ratio of ethylene oxide to monoethanolamine is between about 1.6:1 and 1.7:1.

7. A process according to claim 5 wherein the process is carried out in a closed vessel at a temperature between about 20° C. and 80° C.

8. A process according to claim 3 wherein the olefin oxide is propylene oxide.

9. A process according to claim 4 wherein the olefin oxide is propylene oxide and the alkanolamine is monoisopropanolamine.

10. A process according to claim 9 wherein the molecular ratio of propylene oxide to monoisopropanolamine is at least 1.8:1.

MYRON E. HUSCHER.
MERTON W. LONG, Jr.
JOHN C. MOORE.

REFERENCES CITED

The following references are of record in the file of this patent:

UNITED STATES PATENTS

| Number | Name | Date |
|---|---|---|
| 2,337,004 | Schwoegler | Dec. 14, 1943 |
| 2,373,199 | Schwoegler | Apr. 10, 1945 |

OTHER REFERENCES

Bachman et al.: "Chem. Abs.," vol. 39, pp. 4590–4591 (1945).

Headlee et al.: J. A. C. S., vol. 55, Mar., 1933, p. 1066.

Getman et al: "Outlines of Theoretical Chemistry," Wiley and Sons, New York, N. Y., 1931, p. 336.